C. C. REDMOND & A. W. WHITE.
Beer-Faucet.
No. 226,245.  Patented April 6, 1880.
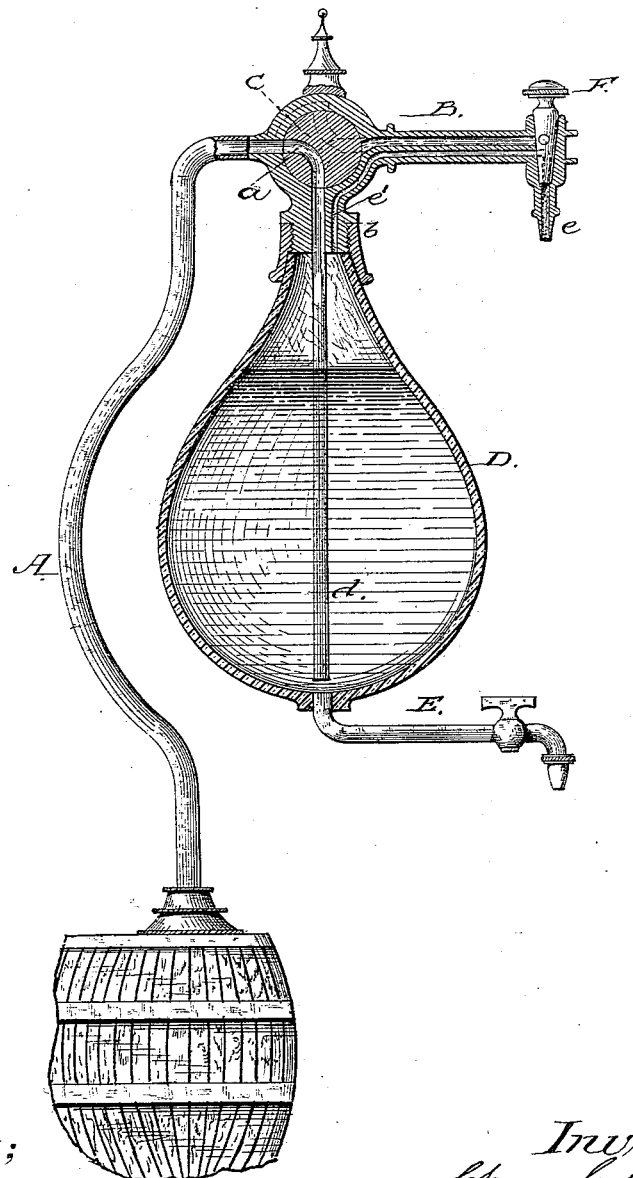
Attest:
J. Walter Fowler
W. H. Morsell
Inventors;
Charles C. Redmond
Archibald W. White
by A. H. Evans & Co.
Attorneys.

UNITED STATES PATENT OFFICE.

CHARLES C. REDMOND AND ARCHIBALD W. WHITE, OF SAN JOSÉ, CAL.

BEER-FAUCET.

SPECIFICATION forming part of Letters Patent No. 226,245, dated April 6, 1880.

Application filed January 24, 1880.

*To all whom it may concern:*

Be it known that we, CHARLES C. REDMOND and ARCHIBALD W. WHITE, of San José, California, have invented a new and useful Improvement in Beer-Faucets, of which the following is a full, clear, and exact description, reference being had to the accompanying drawing, making a part of this specification, and in which the figure shows a vertical section of our faucet as applied to a beer-tube above the counter.

Our invention relates to that class of faucets used for drawing beer and other fermented liquors from the keg or cask, and is an improvement on Patent No. 224,354, issued to us on the 10th of February, 1880.

Our invention consists of the combination of devices hereinafter described and claimed.

To enable others skilled in the art to make and use our invention, we will proceed to describe the exact manner in which we have carried it out.

In the drawings, A is a tube leading from the keg or cask of beer and rising above the counter. On the end of this tube is secured the faucet B, having the plug C, provided with the passage $a$, and of a construction similar to that shown in our patent, on which our present invention is an improvement.

D is a glass or other suitable bulb or globe attached to the lower part of the faucet at $b$ by any of the well-known means. This globe is supplied with the cock E, for the purpose of emptying or cleaning the globe when necessary. This cock may also be used for drawing off beer when desired. The tube $d$ extends from the faucet downward in the globe to a point near its bottom, and through this tube the beer enters the globe, the passage-way being as shown in the drawing, and while the gas and foam rise to the top of the globe the clear liquid settles below. Now, by turning the plug as indicated in dotted lines in the drawing a communication will be established between the globe and the discharge-cock F, the communication with the cask being cut off. Then by opening cock F the clear beer in the bottom of the globe is, by the pressure of the gas in the upper part, forced out through tube $d$ and nozzle $e$.

Should it be necessary to temper the beer to suit the taste of the consumer, it is only necessary to open the passage $e'$ by a quarter-turn of cock E, which allows any desired quantity of the gas to escape from the globe, and by another half-turn of the cock the gas-passage is closed and the passage from tube $d$ is opened for the escape of the beer through the nozzle.

It is evident that two or more nozzles may be attached to one faucet, to be used at the same time, by simply branching the arms of the faucet and attaching as many discharge-cocks as may be needed.

We claim—

An improvement in beer-faucets, consisting of the faucet B, provided with the plug C and cock F, in combination with the globe D, having cock E, the tube $d$, and passage $e'$, all constructed and arranged to operate substantially as and for the purpose set forth.

C. C. REDMOND.
ARCHIBALD W. WHITE.

Attest:
F. M. PFISTER,
A. H. EVANS.